(12) United States Patent
Cattani et al.

(10) Patent No.: US 9,979,302 B2
(45) Date of Patent: May 22, 2018

(54) DEVICE AND METHOD FOR CLOSED-LOOP CONTROL OF A POWER CONVERTER

(71) Applicant: STMICROELECTRONICS S.R.L., Agrate Brianza (IT)

(72) Inventors: Alberto Cattani, Cislago (IT); Alessandro Gasparini, Cusano Milanino (IT); Stefano Ramorini, Arluno (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days. days.

(21) Appl. No.: 15/394,295

(22) Filed: Dec. 29, 2016

(65) Prior Publication Data

US 2018/0034376 A1 Feb. 1, 2018

(30) Foreign Application Priority Data

Jul. 29, 2016 (IT) .................. 102016000080294

(51) Int. Cl.
*H02M 3/335* (2006.01)
*H02M 1/00* (2006.01)

(52) U.S. Cl.
CPC .............. *H02M 3/33515* (2013.01); *H02M 2001/0025* (2013.01)

(58) Field of Classification Search
CPC .... H02M 3/156; H02M 3/1588; H02M 3/335; H02M 2001/0025
See application file for complete search history.

(56) References Cited

U.S. PATENT DOCUMENTS

| | | | |
|---|---|---|---|
| 7,764,054 B1* | 7/2010 | Guo ...................... | H02M 3/156 323/224 |
| 9,048,729 B2* | 6/2015 | Kumagai ............ | H02M 3/1582 |
| 9,240,724 B2* | 1/2016 | Sigamani ............. | H02M 3/285 |
| 9,337,736 B2* | 5/2016 | Chung ...................... | G05F 1/46 |
| 9,444,336 B2* | 9/2016 | Fukumoto ............. | H02M 3/156 |
| 2006/0038803 A1* | 2/2006 | Miller ................ | H05B 33/0815 345/204 |
| 2008/0129265 A1* | 6/2008 | Rosenthal ............. | H02M 3/156 323/283 |
| 2012/0025792 A1 | 2/2012 | Lipcsei et al. | |
| 2012/0235601 A1* | 9/2012 | Teggatz ............ | H05B 33/0818 315/312 |
| 2013/0162171 A1 | 6/2013 | Ishii et al. | |

(Continued)

*Primary Examiner* — Kyle J Moody
(74) *Attorney, Agent, or Firm* — Seed IP Law Group LLP

(57) ABSTRACT

A control device for a switching power converter having an inductor element, a switch coupled to the inductor element, a storage element coupled to an output on which an output voltage is provided, and a diode element coupled to the storage element. The control device generates a command signal to control the switch and determine storage of energy in the inductor element in a first interval, and transfer of energy onto the storage element through the diode element in a second interval. A voltage shifter module generates a feedback voltage shifted relative to the output voltage. An amplification module has a first input receiving the feedback voltage, a second input receiving the reference voltage, and an output that supplies, as a function of the difference between the feedback and reference voltages, a control signal. A control unit receives the control signal and generates the command signal to control the switch.

20 Claims, 6 Drawing Sheets

(56) References Cited

U.S. PATENT DOCUMENTS

| | | | |
|---|---|---|---|
| 2014/0203793 A1* | 7/2014 | Lai | H02M 1/44 |
| | | | 323/283 |
| 2014/0347027 A1* | 11/2014 | Jayaraj | H02M 3/1563 |
| | | | 323/282 |
| 2015/0077073 A1 | 3/2015 | Yu et al. | |
| 2016/0218628 A1* | 7/2016 | Yao | H02M 3/33507 |
| 2016/0241148 A1* | 8/2016 | Kizilyalli | H05K 5/0247 |
| 2016/0247472 A1* | 8/2016 | Liu | G09G 3/3696 |

* cited by examiner

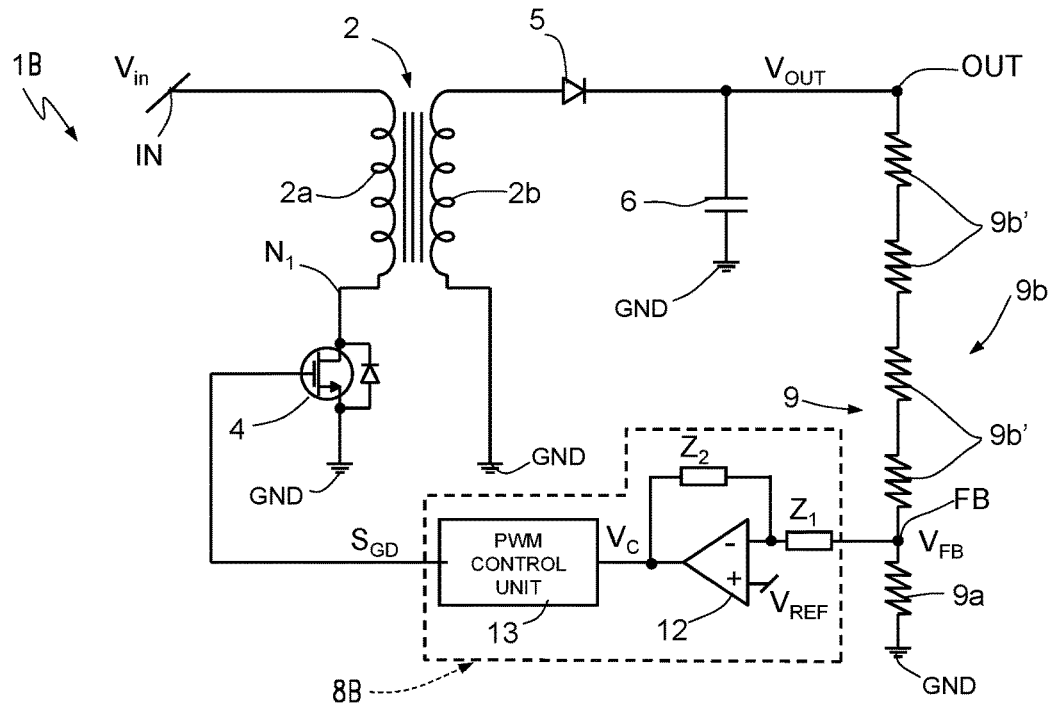
Fig.3 *(Prior Art)*
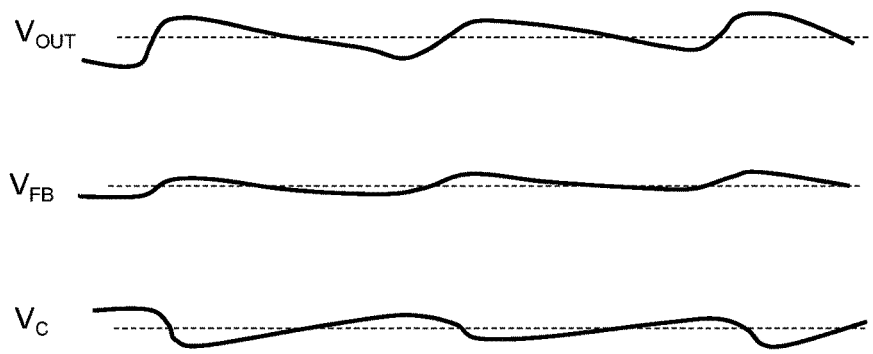
Fig.4 *(Prior Art)*

DEVICE AND METHOD FOR CLOSED-LOOP CONTROL OF A POWER CONVERTER

BACKGROUND

Technical Field

The present disclosure relates to a device and to a method for closed-loop control of a power converter, in particular a DC/DC voltage converter.

Description of the Related Art

As it is known, power converters, in particular voltage converters, are widely used in electronic systems for performing voltage step-up or voltage step-down operations.

In particular, voltage converters, typically with a voltage step-up function, are used in microelectromechanical systems (MEMS), for raising a low-voltage (LV) input voltage coming from a battery (or from a similar supply source) into a high-voltage (HV) output voltage, used, for example, for driving piezoelectric electrodes or elements of related microelectromechanical structures and causing actuation of inertial masses thereof, for example, by the electrostatic or piezoelectric effect.

As shown in FIG. 1, a power converter 1A, which may also be referred to as a switching power converter or simply a switching converter herein, is of a voltage-booster (or step-up) type, in this example of a flyback type, generally including a transformer element 2, having: a primary winding 2a, with a first winding terminal connected to an input IN of the power converter 1A, which receives a low-voltage input voltage $V_{IN}$ (for example, of the order of a few volts, for example, between 3 and 5 V), and a second winding terminal connected to a first internal node $N_1$; and a secondary winding 2b, having a respective first winding terminal coupled via a diode element 5 to an output OUT of the power converter 1A, which supplies a high-voltage output voltage $V_{OUT}$ (for example, of the order of a few tens of volts, e.g., between 40 and 200 V), and a respective second terminal connected to a reference terminal or ground terminal (GND).

In particular, the aforesaid diode element 5 has its anode terminal connected to the first winding terminal of the secondary winding 2b of the transformer element 2, and its cathode terminal connected to the output OUT of the power converter 1A.

The power converter 1A further comprises: a switch element 4, in particular made by a transistor, in the example a MOSFET, having a first current-conduction terminal connected to the second winding terminal of the primary winding 2a of the transformer element 2, a second current-conduction terminal connected to the reference terminal GND, and a control terminal that receives a command signal $S_{GD}$; and a capacitor element 6, connected between the output terminal OUT and the reference terminal GND.

The power converter 1A further comprises a control device 8A, designed to generate the command signal $S_{GD}$, for controlling switching of the switch element 4 and thus regulating the value of the output voltage $V_{out}$.

The control device 8A receives at its input a feedback voltage $V_{FB}$, indicative of the value of the output voltage $V_{out}$, in particular generated on a feedback node FB by a resistive divider 9 coupled to the output OUT and constituted by: a first voltage-divider resistor 9a, connected between the feedback node FB and the reference terminal gnd, and a second voltage-divider resistor 9b, connected between the feedback node FB and the output OUT. In the embodiment illustrated, the second voltage-divider resistor 9b is formed by a plurality of resistor elements 9b', electrically connected in series between the feedback node FB and the output OUT.

The feedback voltage $V_{FB}$ is consequently a signal with values in the low-voltage interval, generated by division of the output voltage $V_{out}$, i.e., a signal with high-voltage values.

The control device 8A, in the embodiment illustrated, is configured so as to implement a hysteresis control, i.e., so as to control the value of the output voltage $V_{out}$ between a lower threshold value $V_{TH}^-$ and an upper threshold value $V_{TH}^+$.

In detail, the control device 8A comprises a comparator 10, having a first comparison input connected to the feedback node FB and receiving the feedback voltage $V_{FB}$, a second comparison input receiving the lower threshold value $V_{TH}^-$ and upper threshold value $V_{TH}^+$, and a comparison output, which supplies a comparison signal $S_{comp}$, as a function of the results of the comparison with hysteresis between the feedback voltage $V_{FB}$ and the lower threshold value $V_{TH}^-$ or upper threshold value $V_{TH}^+$, as illustrated in the diagrams of FIG. 2.

The control device 8A further comprises a logic unit 11, coupled to the output of the comparator 10, which receives the comparison signal $S_{comp}$ and generates the command signal $S_{GD}$ on the basis of the same comparison signal $S_{comp}$.

The present Applicant has realized that this control solution, albeit functional, at least in some operating conditions has some drawbacks.

In particular, the errors of the comparator 10 and the errors possibly present on the voltage references, i.e., on the lower threshold value $V_{TH}^-$ and upper threshold value $V_{TH}^+$, are amplified by the voltage-division gain introduced by the voltage divider 9, which generates the value of the output voltage $V_{out}$; in other words, these errors are amplified in the output signal $V_{out}$. Furthermore, the same low-voltage hysteresis is multiplied by the voltage-division gain.

The electrical characteristics of the comparator 10 consequently substantially affect proper regulation of the value of the output voltage $V_{out}$ (in terms of offset value, regulation rate, and so forth).

FIG. 3 illustrates a further known embodiment of a control device, designated by 8B in FIG. 3, of a power converter 1B (by way of example, once again of a flyback type, made in a manner similar to what has been discussed with reference to FIG. 1).

The control device 8B in this case is configured to implement a closed-loop continuous-time control of the value of the output voltage $V_{out}$ and thus comprises: an operational amplifier 12, in particular an operational transconductance amplifier (OTA), having a first input terminal that receives a reference voltage $V_{ref}$ with an appropriate value (for example, generated by a band-gap generator starting from a supply voltage of the power converter 1B), a second input terminal connected to the feedback node FB by a first impedance element $Z_1$, and an output, which is connected to the second input terminal by a second impedance element $Z_2$ and supplies a control voltage $V_c$, as a function of the error between the reference voltage $V_{ref}$ and the feedback voltage $V_{FB}$, as illustrated in the diagrams of FIG. 4. The control voltage $V_c$ is useful for controlling the value of the output voltage $V_{out}$.

The control device 8B further comprises a PWM control unit 13, which receives the control voltage $V_c$ and generates in an appropriate way the command signal $S_{GD}$ for the switch element 4 in such a way as to minimize the aforesaid error between the reference voltage $V_{ref}$ and the feedback voltage $V_{FB}$.

In particular, in a known way, the PWM control unit 13 may implement a voltage control mode or a current control mode, on the basis of the same control voltage $V_C$, for generating the aforesaid command signal $S_{GD}$, and in particular for defining the duration of the ON interval ($T_{ON}$) and OFF interval ($T_{OFF}$) of the switch element 4 during a corresponding switching period.

For instance, FIG. 5 shows a power converter 1C including a possible embodiment of a known type of the PWM control unit 13 of FIG. 3 in a control device 8C in the case where the PWM control unit implements a voltage control mode.

In this case, the PWM control unit 13 comprises a comparator module 15, having a first comparison terminal coupled to the output of the operational amplifier 12 and receiving the control voltage $V_C$, a second comparison terminal receiving a ramp voltage $V_R$, and an output generating a comparison signal $S_c$.

In particular, the ramp voltage $V_R$ is generated by charging of a capacitor 16 with an appropriate charging current $I_c$, having a constant value, generated by a current generator 17. A switch 18, controlled by a control signal SW, is connected in parallel to the capacitor element 16 in order to determine start of charging and subsequent discharging thereof (and thus the alternately increasing and decreasing pattern of the ramp voltage $V_R$).

The PWM control unit 13 further comprises a S/R flip-flop 19, having: a reset input R, which is connected to the output of the comparator module 15 and receives the comparison signal $S_c$; a set input S connected to a timing module 20; a negated output $\overline{Q}$, which defines the aforesaid control signal SW of switch 18; and an output Q, which supplies, via a driver unit 21, the command signal $S_{GD}$ for controlling switching of the switch element 4 of power converter 1C.

The timing module 20 comprises a detection unit 23, which, in a known manner, here not described in detail, generates a detection signal ZCD indicative of the occurrence of a zero-current condition in the primary winding 2a of the transformer element 2 of the power converter 1.

The timing module 20 further comprises: a delay unit 22, connected to the output of the detection unit 23 and configured to apply an appropriate time delay to the detection signal ZCD; and a OR logic gate 24, having a first input connected to the output of the delay unit 22, a second input connected to a starter unit 25, and an output that supplies the set signal S to the S/R flip-flop 19.

In use, assuming that the switch element 4 is initially closed, the ramp voltage $V_R$ grows until it reaches the value of the control voltage $V_C$, thus switching the output of the comparator module 15, which resets the S/R flip-flop 19 and causes opening of switch element 4.

Consequently, the output of the comparator module 15 determines the duration of the ON interval $T_{ON}$ of the switch element 4.

After opening of the switch element 4, the energy previously stored in the transformer element 2 is transferred onto the capacitor element 6 and onto the load, up to complete demagnetization of the primary winding 2a.

The detection unit 23 of the timing module 20 generates a pulse following upon detection of this demagnetization. This pulse in the detection signal ZCD, appropriately delayed by the delay unit 22, then sets the S/R flip-flop 19 and closes the switch element 4 again, thus determining a new operating cycle of the power converter 1.

Accordingly, the control solution envisages that starting of each new switching cycle occurs after the current in the primary winding 2a has reached a zero level, following upon an appropriate delay. It should be noted that the presence of the OR logic gate 24 in the timing module 20 and of the aforesaid starter unit 25, enables start of a new operating cycle, for example, during turning-on (or during return from a de-activation condition).

In an equally known manner, not illustrated in detail herein in order not to burden the description, in the case of a current control mode, the PWM control unit 13 is configured to generate a control current starting from the control voltage $V_C$ and comparing this control current with a detection current indicative of the current flowing in the primary winding 2a (or in the secondary winding 2b) of the transformer element 2. In this case, the command signal $S_{GD}$ is generated as a function of the comparison between the control current and this detection current.

The present Applicant has realized that also the further control solution described with reference to FIG. 3, at least in some operating conditions, has some drawbacks.

In the first place, also in this solution, errors of the operational amplifier 12 and errors on the reference voltage $V_{ref}$ are amplified by the voltage-division gain defined by the voltage divider 9.

The accuracy of the regulation of the output voltage $V_{out}$ markedly depends upon the electrical characteristics of the error amplifier 12 (DC gain, amplifier offsets, and so forth).

Furthermore, the frequency compensation of the closed control loop in general requires a compensation network. Consequently, the impedance elements $Z_1$, $Z_2$ define in general a complex compensation network, frequently made with components external to the integrated circuit.

BRIEF SUMMARY

Embodiments of the present disclosure solve at least some of the problems highlighted previously, and in particular provide a closed-loop control solution of an improved type for a switching power converter.

According to embodiments of the present disclosure, a control device of a power converter, and a corresponding control method, are consequently provided. In one embodiment, a control device for controlling a converter of the switching type includes a voltage shifter module configured to be coupled to an output of the converter. The voltage shifter module receives a shifting reference voltage and generates on a feedback node a feedback voltage having a value based on an output voltage on the output and the shifting reference voltage. An amplification module has a first input coupled to the voltage shifter module to receive the feedback voltage and a second input coupled to receive a reference voltage. The amplification module generates on an output a control signal as a function of a difference between the feedback voltage and the reference voltage. A control unit is coupled to the amplification module to receive said control signal and generates a command signal to be applied to control switching of a switch element of the converter as a function of the control signal.

BRIEF DESCRIPTION OF THE SEVERAL VIEWS OF THE DRAWINGS

For a better understanding of the present disclosure, preferred embodiments thereof are now described, purely by way of non-limiting example and with reference to the attached drawings, wherein:

FIG. 3 shows a general circuit diagram of the power converter and of a further control device of a known type;

FIG. 4 shows plots of electrical quantities in the control device of FIG. 3;

DETAILED DESCRIPTION

Figure 1:
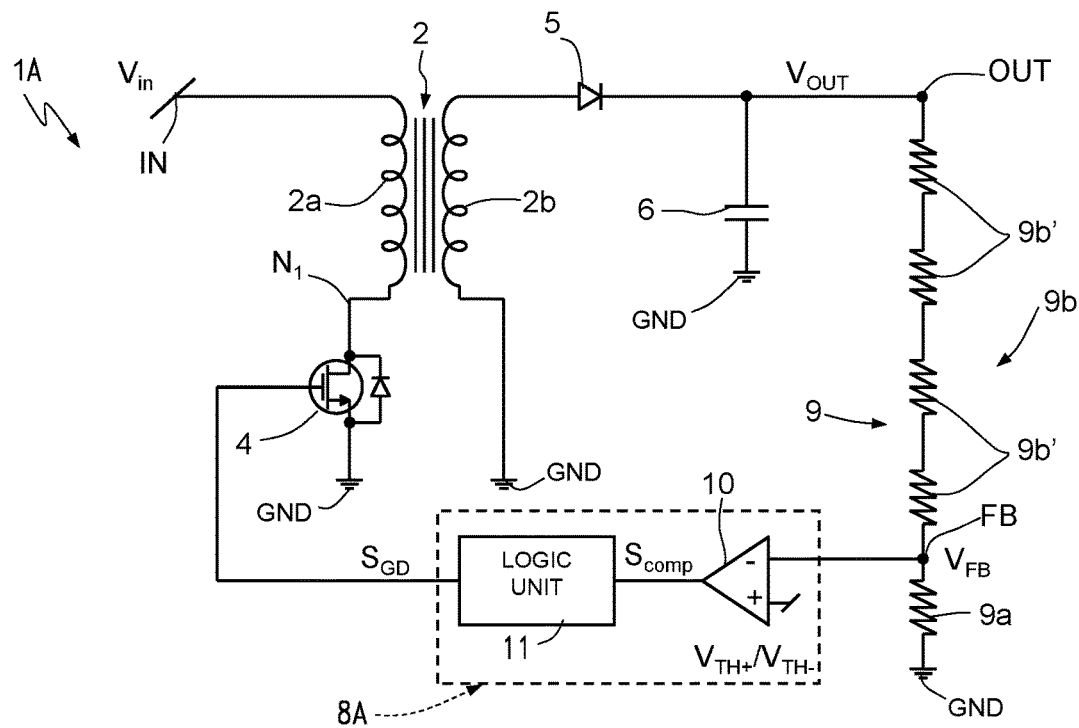
FIG. 1 shows a general circuit diagram of a power converter and of a corresponding control device of a known type.
Figure 2:
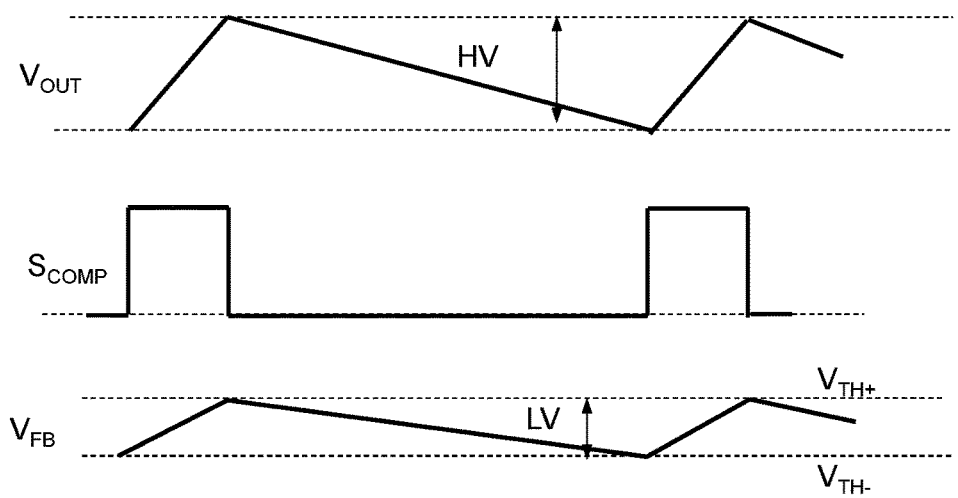
FIG. 2 shows plots of electrical quantities in the control device of FIG. 1.
Figure 5:
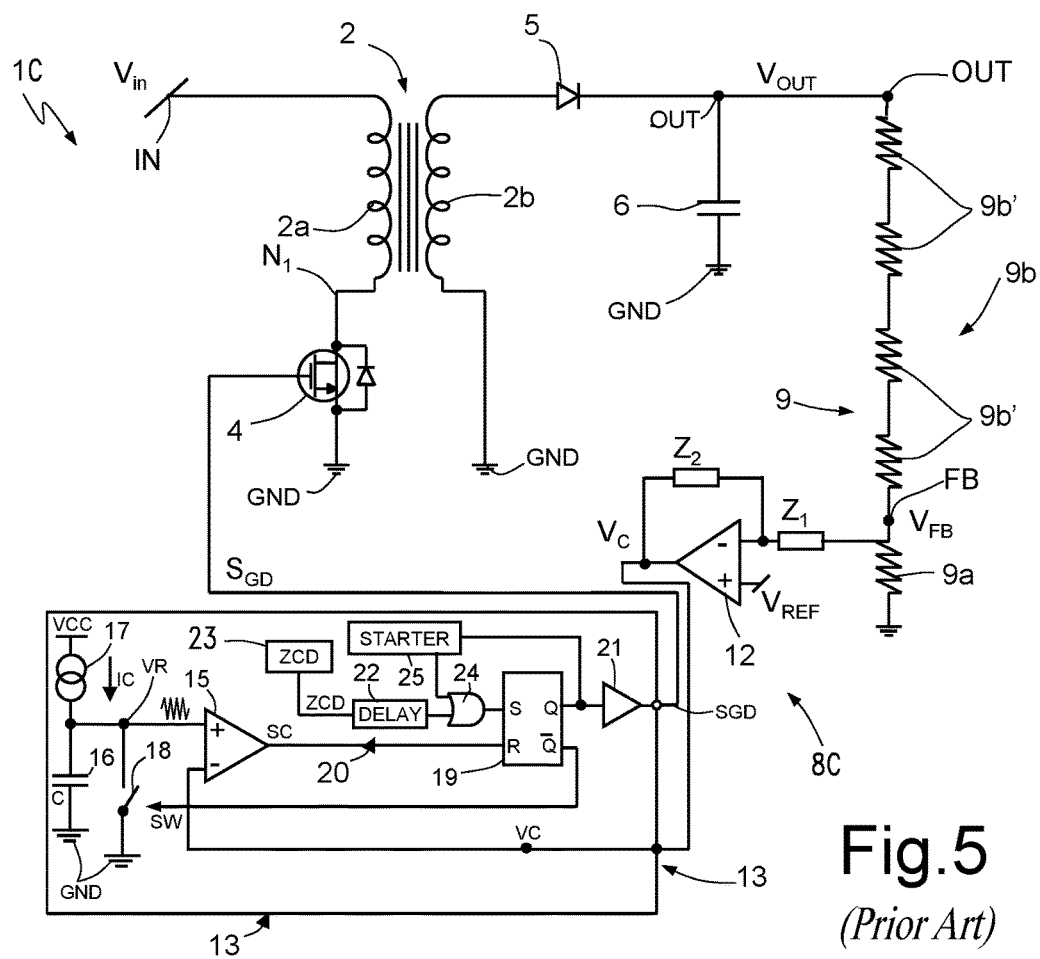
FIG. 5 shows a more detailed circuit diagram of the control device of FIG. 3, which implements voltage control.
Figure 6:
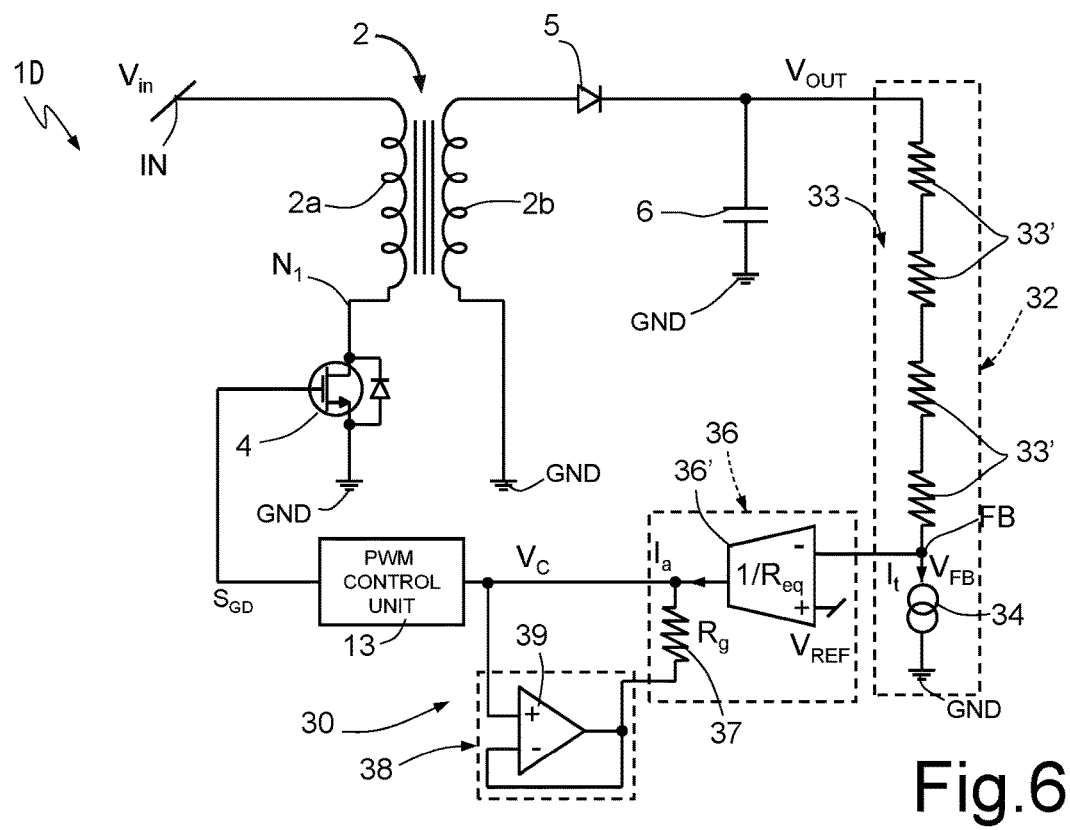
FIG. 6 shows a circuit block diagram of a control device of a switching power converter, according to one embodiment of the present solution.

With reference to FIG. 6, an embodiment is now described of a control device, designated by 30, of a power converter, which in this case is a voltage converter designated by 1D and, purely by way of example, made as described with reference to FIG. 1 and thus being of a flyback booster type. The power converter 1D is consequently not described again in detail.

The control device 30 of the power converter 1D comprises a voltage-shifter module 32, which is connected to the output OUT of the power converter 1D, from which it receives the output voltage $V_{out}$, with a high voltage, and is designed to supply on the feedback node FB the feedback voltage $V_{FB}$, with a low voltage, according to the expression:

$$V_{FB}=V_{out}-V_t$$

where $V_t$ is an appropriate shifting value for shifting the output voltage $V_{out}$ into a low-voltage range.

In particular, in this embodiment, the voltage-shifter module 32 comprises: a shifting resistor 33, connected between the feedback node FB and the output OUT, here formed by a plurality of resistor elements 33', electrically connected in series between the feedback node FB and the output OUT; and a shifting current generator 34, connected between the feedback node FB, on which it supplies a shifting current $I_t$, and the reference terminal GND.

The control device 30 further comprises an amplifier or amplification module 36, having a first input that is connected to the feedback node FB and receives the feedback voltage $V_{FB}$, a second input that receives a reference voltage $V_{ref}$, indicative of a desired value for the output voltage $V_{out}$ (for example, generated by a voltage-reference generator), and an output that supplies a control voltage $V_c$, as a function of the difference (or error) between the feedback voltage $V_{FB}$ and the aforesaid reference voltage $V_{ref}$.

In a manner similar to what has been indicated previously, the control voltage $V_c$ is supplied to the PWM control unit 13, which, starting from the same control voltage $V_c$, generates in a suitable manner (via a voltage control mode, or a current control mode) the command signal $S_{GD}$ for the switch element 4, in such a way as to minimize the error between the reference voltage $V_{ref}$ and the feedback voltage $V_{FB}$.

In the embodiment illustrated, the amplification module 36 includes a differential amplifier 36' operating in a current mode, which generates an output current $I_a$, according to the following expression:

$$I_a=(V_{ref}-V_{FB})/R_{eq},$$

where $R_{eq}$ is the resistance of a resistor internal to the amplification module 36 (as described in greater detail hereinafter).

The amplification module 36 further comprises a gain resistor 37, having a first terminal connected to the output of the amplification module 36, to which it supplies the output current $I_a$ and present on which is the control voltage $V_c$, which is consequently given by the following expression:

$$V_c=(V_{ref}-V_{FB}) \cdot R_g/R_{eq}$$

where $R_g$ is the resistance of the aforesaid gain resistor 37, in the case where the second terminal of the gain resistor 37 is connected to the ground terminal of the device.

In the embodiment illustrated, the control device 30 further comprises a buffer module 38, including an operational amplifier 39 in voltage-follower configuration, connected between the output of the amplification module 36 and a second terminal of the gain resistor 37.

The presence of this buffer module 38 at the second terminal of the gain resistor 37, instead of the connection to ground of the same terminal, advantageously allows maintaining the value of the control voltage $V_c$ at the output of the amplification module 36 in the presence of a zero current on the gain resistor 37, i.e., with a substantially zero error at input to the same amplification module 36, between the reference voltage $V_{ref}$ and the feedback voltage $V_{FB}$, and thus to maintain a substantially zero error on the value of regulation of the output voltage $V_{out}$.

Figure 7:
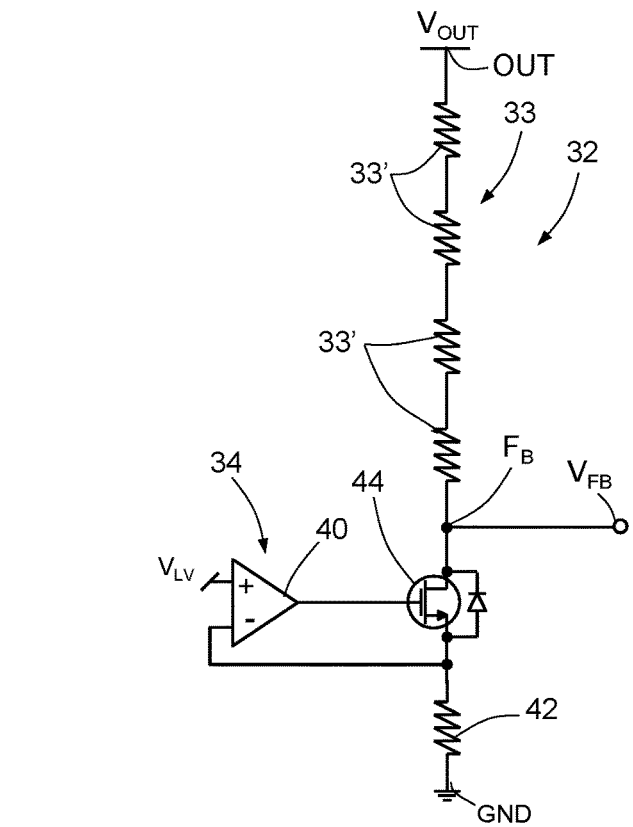
FIG. 7 shows a more detailed circuit solution of a voltage-shifter module in the control device of FIG. 6.

In greater detail, and with reference to FIG. 7, in a possible embodiment the shifting current generator 34 of the voltage shifter module 32 comprises an operational transconductance amplifier (OTA) 40, having a first input terminal that receives a shifting reference voltage $V_{LV}$, having an appropriate low-voltage value, operating as a voltage reference. This shifting reference voltage $V_{LV}$, in a manner not illustrated but that will be evident to a person skilled in the field, may be generated in any known manner (for example, by a voltage-reference generator, of a band-gap type) within the power converter 1D, starting from a corresponding supply voltage, or else may be received from outside by a communication bus, for example, from a control unit of an electronic apparatus where the power converter 1D is used. The value of the shifting reference voltage $V_{LV}$ may also be selected from among a set of possible references allowing to select the regulation voltage $V_{OUT}$ of the entire converter.

The shifting current generator 34 further comprises: a load resistor 42, connected between a second input terminal of the operational transconductance amplifier 40 and the reference terminal GND; and a transistor element 44, in the example of a MOSFET type, having a first current-conduction terminal connected to the feedback node FB of the regulator, a second current-conduction terminal connected to the aforesaid second input terminal of the operational transconductance amplifier 40, and a control terminal connected to the output of the same operational transconductance amplifier 40.

The shifting current generator 34 thus generates a current:

$$I_T = V_{LV}/R_1$$

where $R_1$ is the resistance of the load resistor 42. In a manner that will be evident, considering the entire voltage shifter circuit 32, the feedback voltage $V_{FB}$ is given by the following expression:

$$V_{FB} = V_{out} - V_{LV}(R_2/R_1)$$

where $R_2$ is the total resistance of the shifting resistor 33, and $R_1$ is the resistance of the load resistor 42.

Likewise, the output voltage $V_{out}$, the regulated value of which is ensured by proper operation of the power converter 1D, is given by the following expression:

$$V_{out} = V_{FB} + V_{LV}(R_2/R_1)$$

In particular, given that the control loop operates so as to minimize the error between the reference voltage $V_{ref}$ and the feedback voltage $V_{FB}$, so that $V_{ref} V_{FB}$, the aforesaid expression may be expressed as:

$$V_{out} = V_{ref} + V_{LV}(R_2/R_1)$$

In other words, the value of the output voltage $V_{out}$ is regulated jointly by the value of the reference voltage $V_{ref}$ and by the value of the shifting reference voltage $V_{LV}$.

Advantageously, no attenuations from the high-frequency domain to the low-frequency domain are thus present (given that an operation of voltage shifting is, instead, envisaged).

Any possible errors and noise on the low-voltage values are thus shifted towards the high voltage with unitary gain.

Furthermore, the high-voltage ripple is shifted to low voltage, contributing to providing a wide input signal for the control loop.

The precision of the output voltage $V_{out}$ and the noise on the same output voltage $V_{out}$ are moreover affected solely by the manufacturing of the voltage shifter module 32, where, advantageously, it is possible to control in a very accurate manner the matching between the resistance values of the shifting resistor 33 and load resistor 42 ($R_2/R_1$ ratio), and the value of the reference voltage $V_{ref}$ and of the shifting reference voltage $V_{LV}$ (depending upon which is the value of the output voltage $V_{out}$). Furthermore, the offset from the operational transconductance amplifier 40 may be optimized in an independent manner (without considering, for example, compromises of bandwidth or other characteristics with respect to other stages of the power converter 1D).

Figure 8:
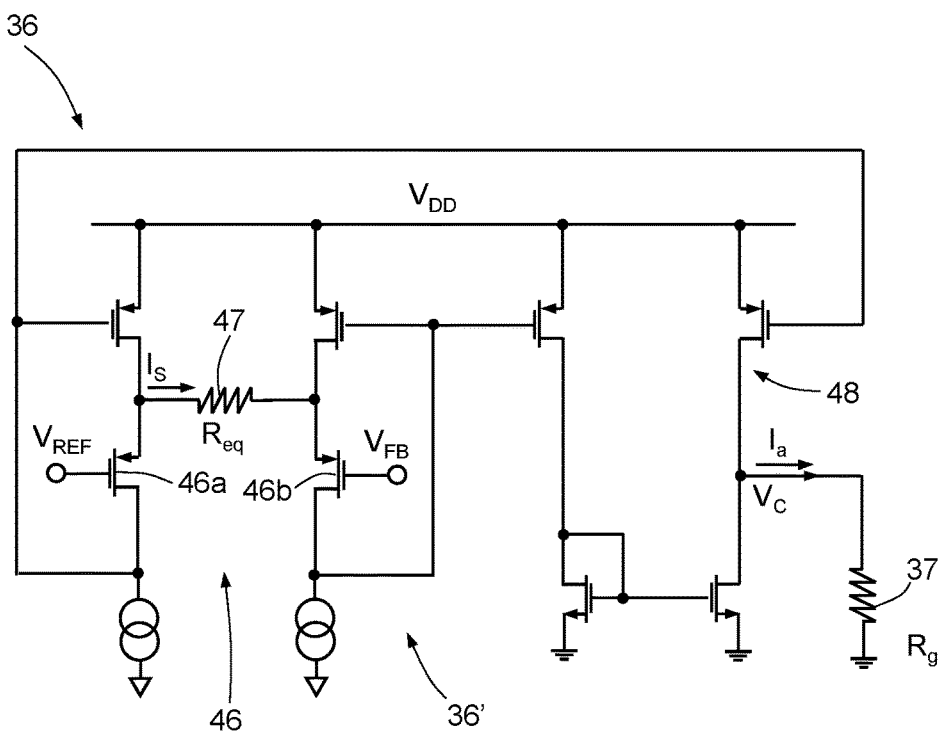
FIG. 8 shows a more detailed circuit solution of an amplifier module in the control device of FIG. 6.

With reference to FIG. 8, a possible circuit implementation is now described of the amplification module 36, and in particular of the corresponding instrumentation amplifier 36', which is also referred to as a difference amplifier herein.

In detail, the instrumentation amplifier 36' comprises a differential input stage 46 constituted by a pair of MOSFETs 46a, 46b, in the example of a PMOS type, having a respective gate terminal that receives the reference voltage $V_{ref}$ and, respectively, the feedback voltage $V_{FB}$.

The aforementioned internal resistor, here designated by 47, having a resistance $R_{eq}$, is connected between the source terminals of the MOSFETs 46a, 46b, and is traversed in use by an unbalancing current $I_s$, which is a function of the difference (or error) between the reference voltage $V_{ref}$ and the feedback voltage $V_{FB}$:

$$I_s = (V_{ref} - V_{FB})/R_{eq}$$

The differential amplifier 36' further comprises a current-mirror stage 48, electrically coupled to the differential input stage 46 (of a known type, here not described in detail), configured to mirror, in the example with unitary mirror factor, the unbalancing current $I_s$ on the output of the amplification module 36, thus generating the aforementioned output current $I_a$.

As previously mentioned, and as illustrated in FIG. 8, this output current $I_a$ generates on the gain resistor 37, connected to the output of the amplification module 36, the control voltage $V_c$:

$$V_c = I_a \cdot R_g$$

Advantageously, the solution described for the amplification module 36 is simple to implement with limited electrical consumption and area occupation in the integrated implementation. In fact, thanks to the fact that the voltage shifter module 32 does not introduce any attenuation, it is possible to use a simple single-stage gain module for the same amplification module 36.

Furthermore, the gain of the amplification module 36 may be controlled accurately, being given by a ratio between resistances, and may also be varied in a linear way (for example, in the range 1 to 30) by simply varying the resistance of the gain resistor 37.

The characteristics of the instrumentation amplifier 36' may be optimized, for example, in terms of offset, in an independent manner, without constraints represented by the other modules of the power converter 1D. It is, however, advantageous for the instrumentation amplifier 36' to have a wider bandwidth than that of the control loop implemented by the PWM control unit 13, in order not to introduce further singularities. Given the simple construction, also this requirement may, however, be easily satisfied.

In the solution illustrated in the aforesaid FIG. 8, the gain resistor 37 is connected between the output of the amplification module 36 and the reference terminal GND.

Figure 9:
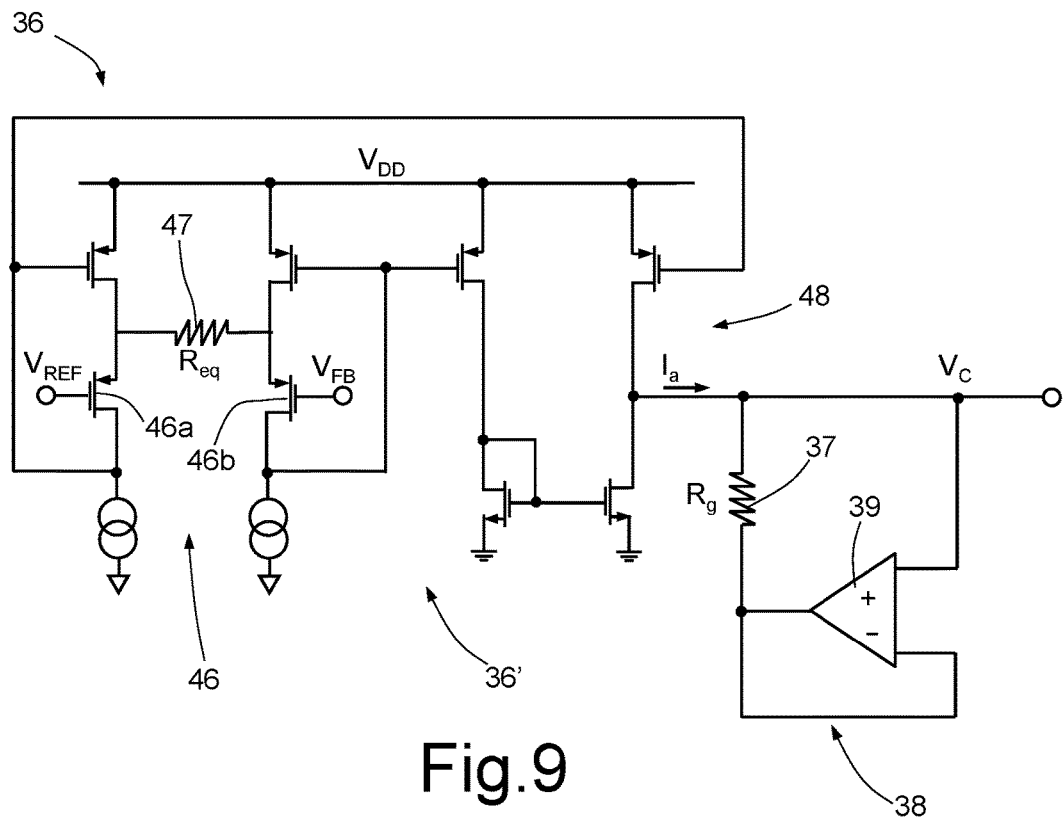
FIG. 9 shows a more detailed circuit solution of the amplifier module of FIG. 6 and of an associated voltage control loop.

As described previously, and as illustrated in FIG. 9, the buffer module 38 may, instead, be provided, including the operational amplifier 39 in voltage follower configuration, connected between the output of the amplification module 36 and the second terminal of the gain resistor 37.

In particular, the operational amplifier 39 has a non-inverting input connected to the output of the amplification module 36, and an inverting input, connected to the output of the operational amplifier 39, that is connected to the aforesaid second terminal of the gain resistor 37.

The buffer module 38 acts as a further DC control loop within the control device 30.

In particular, in static steady-state conditions, i.e., when the control loop has settled the value of the output voltage $V_{out}$ around the desired value, the buffer module 38 maintains the value of the control voltage $V_c$ with an input having a zero value, i.e., with a zero regulation error (the feedback voltage $V_{FB}$ is substantially equal to the reference voltage $V_{ref}$). This characteristic moreover enables a substantial immunity in regard to parasitic phenomena.

In dynamic conditions, for example, in a condition of load-variation, the instrumentation amplifier 36' reacts in a fast way, whereas the additional control loop defined by the buffer module 38 reacts slowly for regulating the subsequent static condition.

The bandwidth of the aforesaid further control loop is thus sized in relation to the bandwidth of the main control loop for optimizing stability and performance of the regulator. Furthermore, in a manner that will be evident to a person skilled in the field, the buffer module 38 is required to absorb (or supply) the maximum current required by the instrumentation amplifier 36', to prevent errors during dynamic variations.

The presence of the buffer module 38 advantageously allows to maintain the value of the control voltage $V_c$ at output from the amplification module 36, with a zero current in the gain resistor 37, i.e., with a substantially zero error on the input of the amplification module 36, between the reference voltage $V_{ref}$ and the feedback voltage $V_{FB}$, thus maximizing the precision of regulation of the output voltage $V_{out}$.

The advantages of the solution proposed emerge clearly from the foregoing description.

Figure 10:
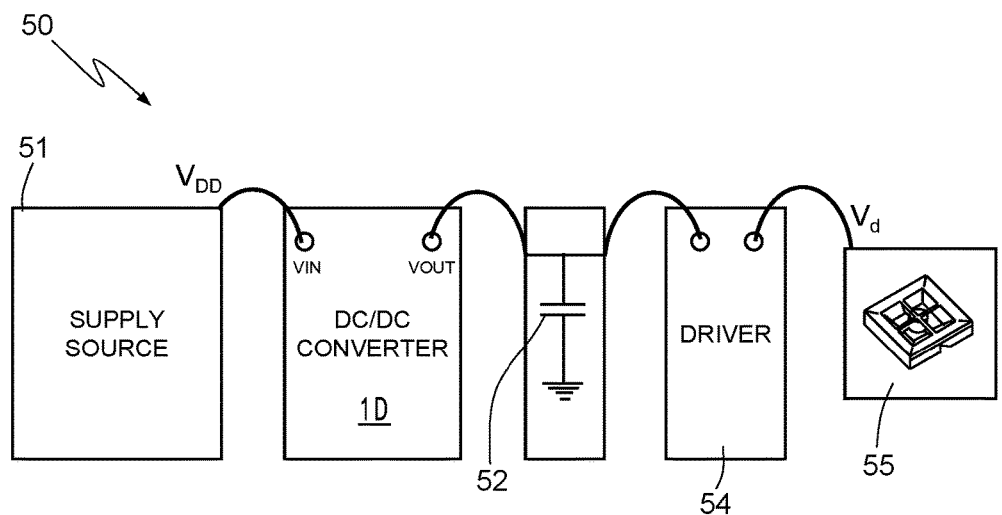
FIG. 10 is a block diagram of a microelectronic system in which the power converter and the corresponding control device are used according to a further aspect of the present solution.

In any case, it is again emphasized that this solution provides an improved closed-loop control of a power converter 1D, being able to ensure also a substantially zero error of regulation in static conditions (in DC conditions). The solution described may thus advantageously be used in a microelectronic system, of the type described, for example, with reference to FIG. 10.

The microelectronic system, designated as a whole by 50, comprises:

a supply source 51, for example, a battery supply source, which supplies a supply voltage $V_{DD}$, in the low-voltage range;

the power converter 1D, for example, of a step-up type, including the control device 30, illustrated previously in detail, designed to supply an output voltage $V_{out}$, having a boosted value with respect to the supply voltage $V_{DD}$ (which constitutes the input voltage $V_{IN}$);

a storage element 52, for example, a capacitor element, connected to the output out of the power converter 1D; and a driver device 54, which is connected to the storage element 52 and is configured to generate a driving voltage Vd, having an appropriate value in the high-voltage range, for driving, for example, electrodes of a MEMS structure 55, which constitutes the load of the microelectronic system 50, for example, for moving a corresponding inertial mass by the electrostatic or piezoelectric effect.

Finally, it is clear that modifications and variations may be made to what is described and illustrated herein, without thereby departing from the scope of the present disclosure, as defined in the annexed claims.

In particular, it is again emphasized that, even though the foregoing description has made explicit reference to a power converter 1D of a flyback type, the present solution may advantageously be applied also to other topologies of voltage converters, not only of a step-up type (for example, boost converters), but also of a step-down type (for example, of a buck type), or of an inverter type (for example, of an inverting buck-boost type).

Furthermore, as on the other hand has already been discussed previously, it is again emphasized that the solution described may be used irrespective of the control algorithm, whether with voltage or current control, implemented by the PWM control unit 13 of the power converter 1D for generating the command signal $S_{GD}$ for controlling switching of the switch element 4 of the same power converter 1D.

Finally, it is underlined that the converter according to the present solution may advantageously provide a voltage regulator or converter, to which the foregoing discussion has made explicit reference, by way of a non-limiting example, or a current regulator or converter (for example, in driver devices for LEDs or in battery chargers). The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control device for controlling a switching converter, comprising:
   a voltage shifter circuit configured to be coupled to an output of the converter and coupled to receive a shifting reference voltage, the voltage shifter module including,
      a shifting resistor have a fixed value coupled between a feedback node and the output, and
      a current generator including a load resistor coupled in series with a switching element between the feedback node and a reference voltage node, the switching element configured to receive a shifting reference voltage and to provide a shifting current through the shifting and load resistors based on the shifting the reference voltage,
   wherein the voltage shifter circuit is configured to generate, on the feedback node, a feedback voltage having a value based on an output voltage on the output and on the shifting reference voltage;
   an amplification circuit having a first input coupled to the voltage shifter module to receive the feedback voltage and a second input coupled to receive a reference voltage, the amplification module configured to generate on an output a control signal as a function of a difference between the feedback voltage and the reference voltage; and
   a control circuit coupled to the amplification module to receive the control signal and configured to generate a command signal to be applied to control switching of a switch element of the converter as a function of the control signal.

2. The control device according to claim 1, wherein the shifting resistors comprises a plurality of resistors coupled in series between the output and the feedback node.

3. The control device according to claim 1, wherein the current generator comprises:
   an operational amplifier having a first input terminal coupled to receive the shifting reference voltage, a second input terminal, and an output;
   the load resistor coupled between a second input terminal of the operational amplifier and a reference terminal; and
   wherein the switching element is a transistor coupled between the feedback node and the second input terminal of the operational amplifier and having a control terminal coupled to the output of the operational amplifier, wherein the feedback voltage is given by the following expression:

$$V_{FB} = V_{out} - V_{LV}(R_2/R_1)$$

where $V_{FB}$ is the feedback voltage, $V_{out}$ is the output voltage, $R_2$ is the resistance of the shifting resistor, and $R_1$ is the resistance of the load resistor.

4. The control device according to claim 3, wherein the voltage shifter module is configured to carry out a step-down shifting of the output voltage from a first high-voltage value to a second low-voltage value, the second low-voltage value having a magnitude that is less than the first high-voltage value.

5. The control device according to claim 1, wherein the amplification module comprises:

an instrumentation amplifier configured in a current mode to generate an output current according to the following expression:

$$I_a = (V_{ref} - V_{FB})/R_{eq}$$

where Ia is the output current, Vref is the reference voltage, $V_{FB}$ is the feedback voltage, and $R_{eq}$ is the resistance of a resistor internal to the amplification module; and a gain resistor having a first terminal connected to the output of the amplification module on which the control signal is generated, a value of the control signal being given by the following expression:

$$V_c = (V_{ref} - V_{FB}) \cdot R_g / R_{eq},$$

where Vc is the control signal and $R_g$ is the resistance of the gain resistor.

6. The control device according to claim 5, wherein the instrumentation amplifier comprises:
a differential input stage including a pair of transistors having respective first and second control terminals that receive the reference voltage and, respectively, the feedback voltage, and the pair of transistors including signals terminals with the resistor internal to the amplification module being coupled across respective signal terminals of the pair of transistors, and the differential stage configured to generate through the resistor internal to the amplification module an unbalancing current that is a function of the difference between the reference voltage and the feedback voltage; and
a current-mirror stage electrically coupled to the differential input stage and configured to mirror the unbalancing current on the output of the amplification module as the output current.

7. The control device according to claim 1, further comprising a buffer module including an operational amplifier in a voltage-follower configuration, the buffer module is coupled to the output of the amplification module and configured to maintain a value of the control signal in response to the reference voltage and the feedback voltage on the second and first inputs, respectively, of the amplification module being approximately equal.

8. The control device according to claim 1, wherein the control unit is configured to implement a voltage control mode or a current control mode based on the control signal to generate the command signal to define durations of a first interval and a second interval of a switching period of the switch element.

9. A switching power converter, comprising:
switching circuitry including an input configured to receive an input voltage, an output, a switching element configured to control generation of an output voltage on the output based upon a command signal;
a control device including,
a voltage shifter module coupled to the output of the power converter and coupled to receive a shifting reference voltage, the voltage shifter module configured to generate on a feedback node a feedback voltage having a value based on the output voltage on the output of the power converter and the shifting reference voltage, the voltage shifter module including,
a shifting resistor having a value that is independent of the shifting reference voltage coupled between the feedback node and the output of the power converter, and
a current generator including a load resistor coupled in series with a switching element between the feedback node and a reference voltage node, the switching element configured to receive the shifting reference voltage and to provide a shifting current through the shifting and load resistors based on the shifting the reference voltage;
an amplification module having a first input coupled to the voltage shifter module to receive the feedback voltage and a second input coupled to receive a reference voltage, the amplification module configured to generate on an output a control signal as a function of a difference between the feedback voltage and the reference voltage; and
a control unit coupled to the amplification module to receive the control signal and configured to generate the command signal to control switching of the switching element based on the control signal.

10. The switching power converter according to claim 9, wherein the switching circuitry comprises one of a voltage step-up type converter, a step-down type converter, and an inverter type converter.

11. The switching power converter of claim 10, wherein the switching circuitry comprises a voltage step-up type converter having a boost or flyback type configuration.

12. The switching power converter of claim 9, wherein the control unit comprises a pulse width modulation control unit configured to pulse width modulate the command signal based on the control signal from the amplification module.

13. A method, comprising:
receiving a shifting reference voltage;
receiving on an output node an output voltage generated by a switching power converter;
providing a shifting current through a load resistance coupled between the a feedback node and a reference node, the shifting current having a value based on the shifting reference voltage;
providing the shifting current through a shifting resistance coupled between the output node and the feedback node;
generating a feedback voltage on the feedback node, the feedback voltage having a value based on the shifting reference voltage and the output voltage from the switching power converter;
receiving a reference voltage;
generating, as a function of a difference between the feedback voltage and the reference voltage, a control signal; and
generating a command signal to control switching of the power converter as a function of the control signal.

14. The method according to claim 13, wherein generating the feedback voltage comprises carrying out a step-down shifting of the output voltage from a first high-voltage value to a second low-voltage value that is lower than the first high-voltage value.

15. The method according to claim 14, wherein generating the control signal comprises:
generating an output current as a function of the difference between the feedback voltage and the reference voltage; and
supplying the output current to a gain resistor on which the control signal is present.

16. The method according to claim 15 further comprising maintaining, via an operational amplifier in a voltage follower configuration, the value of the control signal in a presence of a substantially zero error between the reference voltage and the feedback voltage.

17. The method according to claim 13, wherein generating the command signal comprises implementing a voltage control mode or a current control mode on the basis of the control signal to generate the command signal and defining for the switching of the switching power converter a duration of a first interval and a duration of a second interval of a switching period of a switch element of the switching power converter.

18. The method of claim 13, wherein generating the feedback voltage further comprises generating the feedback voltage to minimize the difference between the reference voltage and the feedback voltage.

19. The method of claim 13, wherein providing the shifting current through the load resistance comprises controlling a transistor with the shifting reference voltage to set a value of the shifting current.

20. The method of claim 19, wherein generating the control signal comprises amplifying a difference between the feedback voltage and the reference voltage.

\* \* \* \* \*